(12) United States Patent
Khare et al.

(10) Patent No.: US 12,395,846 B2
(45) Date of Patent: Aug. 19, 2025

(54) ROGUE NETWORK FUNCTION DETECTION AND ISOLATION IN A COMMUNICATION NETWORK

(71) Applicant: Nokia Technologies Oy, Espoo (FI)

(72) Inventors: Saurabh Khare, Bangalore (IN); Narasimha Rao Pulipati, Redmond, WA (US); Nagendra Bykampadi, Bangalore (IN); Suresh Nair, Whippany, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 456 days.

(21) Appl. No.: 18/001,928

(22) PCT Filed: Jun. 24, 2021

(86) PCT No.: PCT/IB2021/055630
§ 371 (c)(1),
(2) Date: Dec. 15, 2022

(87) PCT Pub. No.: WO2021/260630
PCT Pub. Date: Dec. 30, 2021

(65) Prior Publication Data
US 2023/0247433 A1    Aug. 3, 2023

(30) Foreign Application Priority Data
Jun. 25, 2020    (IN) .............................. 202041027025

(51) Int. Cl.
*H04W 12/06* (2021.01)
*H04L 9/40* (2022.01)
*H04W 12/122* (2021.01)

(52) U.S. Cl.
CPC ....... *H04W 12/122* (2021.01); *H04L 63/1441* (2013.01)

(58) Field of Classification Search
CPC .................................................. H04W 12/122
See application file for complete search history.

(56) References Cited

U.S. PATENT DOCUMENTS 9,800,606 B1 * 10/2017 Yumer ................ H04L 63/1416
2012/0233656 A1    9/2012 Rieschick et al.
2019/0238561 A1 *  8/2019 McGloin ............... G06F 21/554

FOREIGN PATENT DOCUMENTS

EP          3313114 A1    4/2018

OTHER PUBLICATIONS

"3rd Generation Partnership Project; Technical Specification Group Services and System Aspects; Security architecture and procedures for 5G system (Release 16)", 3GPP TS 33.501, V16.2.0, Mar. 2020, pp. 1-227.

(Continued)

*Primary Examiner* — Michael T Vu
(74) *Attorney, Agent, or Firm* — Carter, DeLuca & Farrell LLP

(57) ABSTRACT

Techniques for detecting and isolating rogue network entities in a communication network are provided. For example, a method comprises receiving from at least one network entity in a communication network a message identifying one or more network entities suspected of malicious activity operating within the communication network, and initiating one or more remedial actions within the communication network to prevent the one or more network entities suspected of malicious activity operating within the communication network from accessing other network entities in the communication network.

5 Claims, 5 Drawing Sheets

(56) References Cited

OTHER PUBLICATIONS

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Core Network and Terminals; 5G System; Authentication Server Services; Stage 3 (Release 16)", 3GPP TS 29.509, V16.3.0, Mar. 2020, pp. 1-58.

"3rd Generation Partnership Project; Technical Specification Group Core Network and Terminals; 5G System; Network Function Repository Services: Stage 3 (Release 16)", 3GPP TS 29.510, V16.3.0, Mar. 2020, pp. 1-172.

International Search Report and Written Opinion received for corresponding Patent Cooperation Treaty Application No. PCT/IB2021/055630, dated Aug. 25, 2021, 10 pages.

\* cited by examiner

US 12,395,846 B2

ROGUE NETWORK FUNCTION DETECTION AND ISOLATION IN A COMMUNICATION NETWORK

RELATED APPLICATION

This application was originally filed as PCT Application No. PCT/IB2021/055630, filed on Jun. 24, 2021, which claims priority from IN Application No. 202041027025, filed on Jun. 25, 2020, each of which is incorporated herein by reference in its entirety.

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," the disclosure of which is incorporated by reference herein in its entirety. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with malicious (rogue) actors can present a significant challenge.

SUMMARY

Illustrative embodiments provide techniques for detecting and isolating rogue network functions in a communication network.

For example, in one illustrative embodiment, a method comprises receiving from at least one network entity in a communication network a message identifying one or more network entities suspected of malicious activity operating within the communication network, and initiating one or more remedial actions within the communication network to prevent the one or more network entities suspected of malicious activity operating within the communication network from accessing other network entities in the communication network.

For example, in another illustrative embodiment, a method comprises sending to at least one network entity in a communication network a message identifying one or more network entities suspected of malicious activity operating within the communication network. This advantageously may cause initiation of one or more remedial actions within the communication network to prevent the one or more network entities suspected of malicious activity operating within the communication network from accessing other network entities in the communication network.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems.

It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 5G TS 29.509, entitled "Technical Specification Group Core Network and Terminals; 5G System; Authentication Server Services" and 5G TS 29.510, entitled "Technical Specification Group Core Network and Terminals; 5G System; Network Function Repository Services," the disclosures of which are incorporated by reference herein in their entireties, are mentioned below in the context of some illustrative embodiments.

However, while well-suited for 5G-related 3GPP standards, embodiments are not necessarily intended to be limited to any particular standards.

Illustrative embodiments are related to service authorization in 5G networks. Prior to describing such illustrative embodiments, a general description of main components of a 5G network will be described below in the context of FIGS. 1 and 2.

Figure 1:
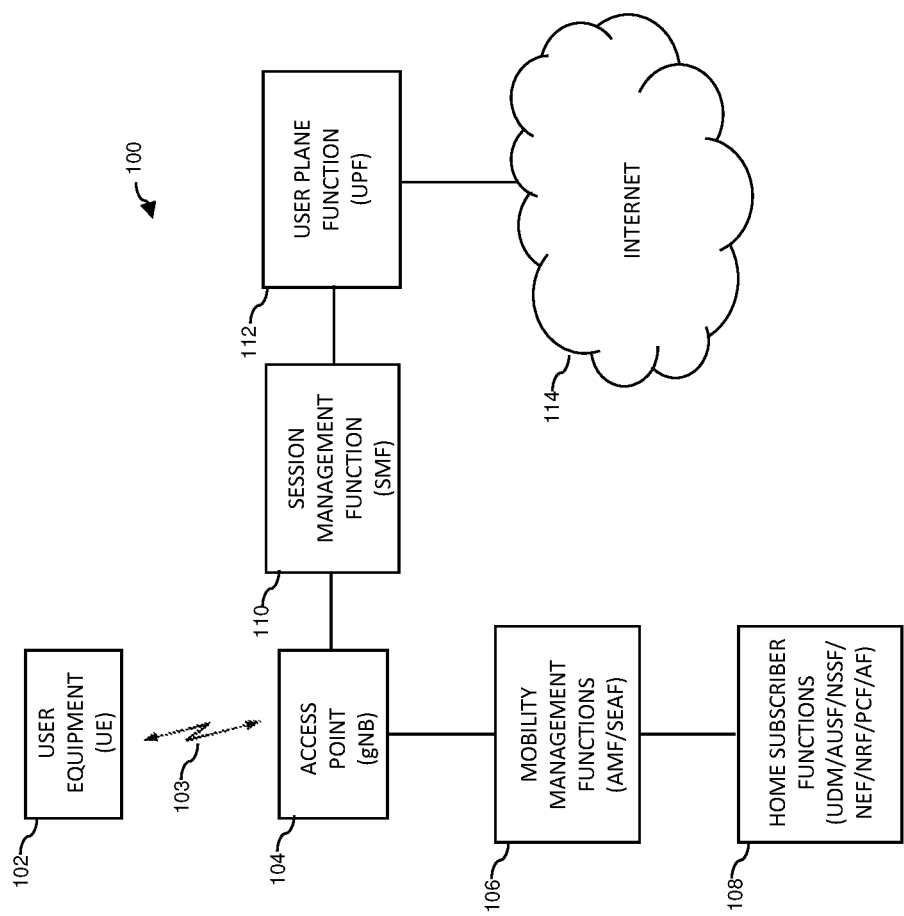
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
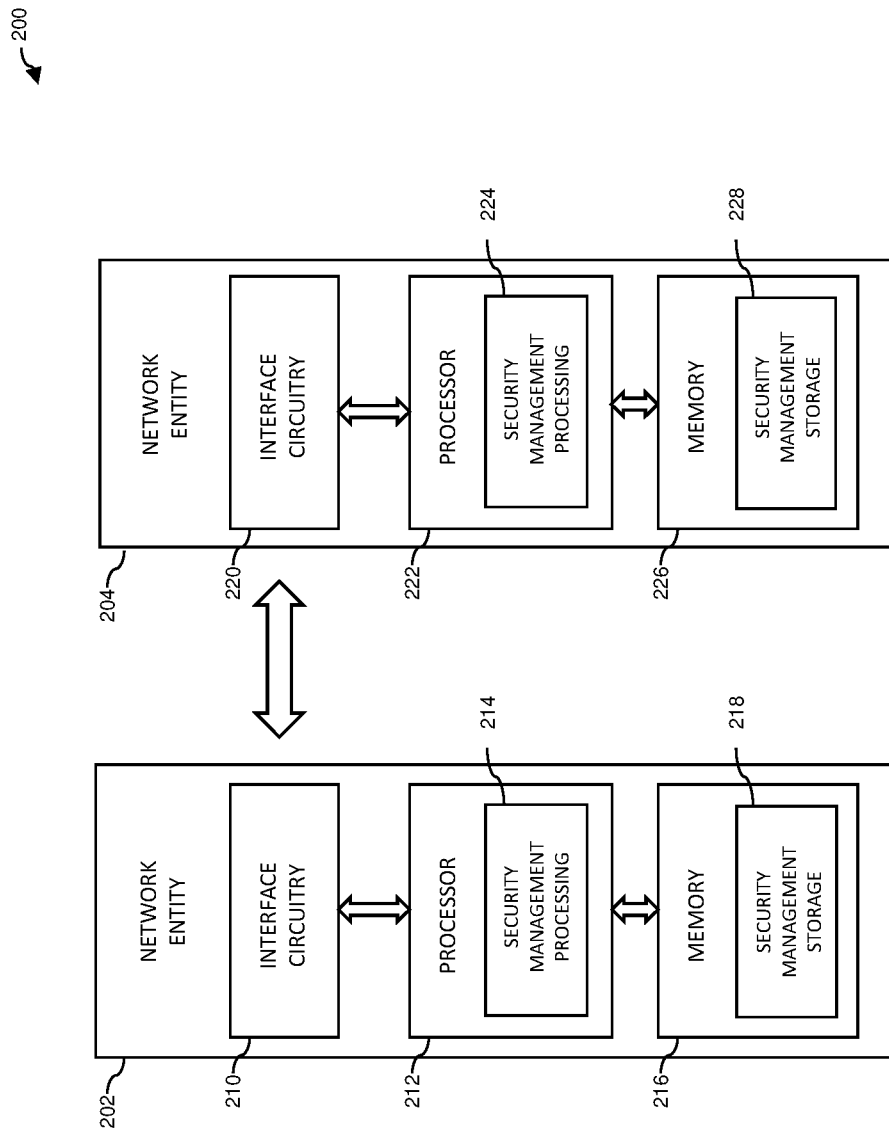
FIG. 2 illustrates network entities with which one or more illustrative embodiments may be implemented.

FIG. 2 is a block diagram of network elements/functions for providing authorization in a service communication proxy in a communication system in an illustrative embodiment. System 200 is shown comprising a first network entity 202 and a second network entity 204. It is to be appreciated that the network entities 202 and 204 represent any network entities (network functions, nodes, components, elements, services, etc.) that are configured to provide security management and other techniques described herein, for example, but not limited to, AMF, SEAF, UDM, AUSF, NSSF, NEF, NRF, PCF and AF such as are part of an SBA-based 5G core network (which is part of an HPLMN, VPLMN, or both).

Further, network entity 202 or 204 can be a network function, node, component, element, service, etc., external to the SBA-based 5G core network, i.e., a third-party external enterprise network.

Still further, network entity 202 and/or 204 can represent one or more processing devices configured to orchestrate and manage instantiation of one or more network functions (or other security management entities) within an SBA-based 5G core network or any communication network. Instantiation of a network function is described in the various 3GPP standards and otherwise well known to those of ordinary skill in the art.

The network entity 202 comprises a processor 212 coupled to a memory 216 and interface circuitry 210. The processor 212 of the network entity 202 includes a security management processing module 214 that may be implemented at least in part in the form of software executed by the processor. The processing module 214 performs operations associated with security management as described in conjunction with subsequent figures and otherwise herein. The memory 216 of the entity 202 includes a security management storage module 218 that stores data generated or otherwise used during security management operations.

The network entity 204 comprises a processor 222 coupled to a memory 226 and interface circuitry 220. The processor 222 of the network entity 204 includes a security management processing module 224 that may be implemented at least in part in the form of software executed by the processor 222. The processing module 224 performs operations associated with security management as described in conjunction with subsequent figures and otherwise herein. The memory 226 of the network entity 204 includes a security management storage module 228 that stores data generated or otherwise used during security management operations.

The processors 212 and 222 of the respective network entities 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network entities 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network entities 202 and 204 illustratively comprise transceivers or other communication hardware or firmware that allows the associated system elements to communicate with one another in the manner described herein.

It is apparent from FIG. 2 that network entity 202 is configured for communication with network entity 204 and vice-versa via their respective interface circuitries 210 and 220. This communication involves network entity 202 sending data to the network entity 204, and the network entity 204 sending data to the network entity 202. However, in alternative embodiments, other network elements may be operatively coupled between the network entities 202 and 204. The term "data" as used herein is intended to be construed broadly, so as to encompass any type of information that may be sent between network entities including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network entity can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Figure 3:
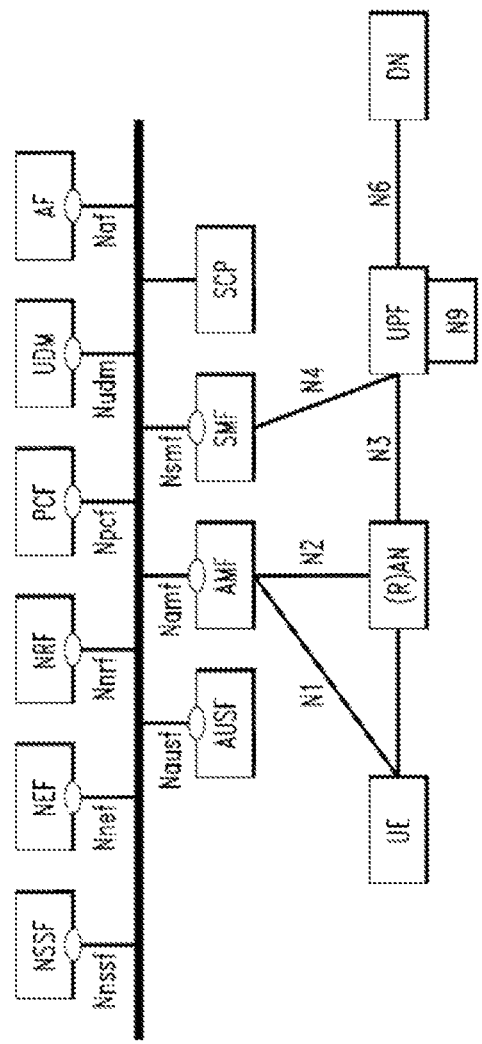
FIG. 3 illustrates a service-based architecture for a communication system within which one or more illustrative embodiments may be implemented.

The architecture for 5G systems is currently being standardized in 3GPP. As mentioned above, the 3GPP TS 23.501 defines the 5G system architecture as service-based, e.g., Service-Based Architecture (SBA). FIG. 3 illustrates a general 5G SBA implementation 300 as further described in 3GPP TS 23.501. Note that the network elements/functions in FIG. 3 are the same or similar to those described above in the context of FIGS. 1 and 2. The notation of a capital "N" in front of the network entity name (e.g., Nausf) denotes the SBA-based interface within the core network used to access the particular network entity (e.g., AUSF).

It is realized herein that in deploying different NFs, as depicted in FIG. 3, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, AUSF may need to interact with an authentication, authorization, and accounting (AAA) server managed by a third-party enterprise ("third-party" here illustratively refers to a party other than the network operator of the SBA-based 5G core network). Using conventional 5G approaches, this results in AUSF supporting multiple services both internally and externally at the same time. Internally, AUSF may provide services to AMF, SMF, NEF, UDM, etc., while at the same time interacting with an external AAA server (e.g., an external NF configured for network slice authentication) which may be owned and operated by a third-party entity. More generally, in a 5G core network, each NF provides a defined set of services (acting as service producers) to other NFs (service consumers). Each NF can be a service producer for one service and service consumer for another service.

Conventionally, the core network of a PLMN comprising different network functions is considered secure because it is managed by the PLMN operator at a central physically secure location, with each of the network functions implemented in discreet standalone boxes. However, with the advent of 5G, the core network functions are expected to be virtualized entities running on cloud platforms. These cloud platforms may be owned and operated by the PLMN operator himself or may be run on commercial public cloud platforms such as, by way of example only, an Amazon® (Seattle WA) cloud platform and/or a Microsoft Azure® (Redmond CA) cloud platform. In such cloud platforms, there could be multiple enterprise tenants running multiple virtual machines (VM) on the same hardware and software infrastructure. These cloud platforms may be attacked (hacked) by malicious actors to host rogue NFs. It is realized herein that it would be desirable for the core network to be able to detect and defend against such rogue NFs.

When any NF detects a Denial of Services (DoS) attack or any suspicious behavior from a peer NF/IP (Internet Protocol)/network, the receiver NF shall try to defend itself via blocking the connection, blocking the sender NF, etc. There can be multiple scenarios for the attack whereby the rogue NF sends one or more messages with a malicious intent and/or malicious activity (considering a Transport Layer Security (TLS) connection between the sender NF and the receiver NF is successful):

1) Suspicious rogue (sender) NF may create X number of connections within Y time window at the (receiver) NF which is more than the configured threshold connection.
2) Suspicious rogue (sender) NF may send junk data to the NF, i.e., incorrect messages having unexpected content types.
3) Suspicious rogue (sender) NF may use the expired or invalid token for each incoming request which causes failures at the NF (more than the configured threshold).
4) Suspicious rogue (sender) NF continuously sends more messages than the capacity or load indicated in NF Profile.
5) Suspicious rogue (sender) NF sends huge sized payloads in single requests to block network resources and cause congestion.
6) Suspicious rogue (sender) NF replay sends traffic mostly causing failure in processing due to unidentified subscribers or contexts.
7) Suspicious rogue (sender) NF continuously sends one or more messages to the wrong port number of the NF receiver on which a sender is not allowed to send.

But when a receiver NF blocks another sender NF based on suspected malicious intent/activity, this information about the suspicious NF is not currently shared with the network, so that further attacks can be prevented on other NFs.

Figure 4:
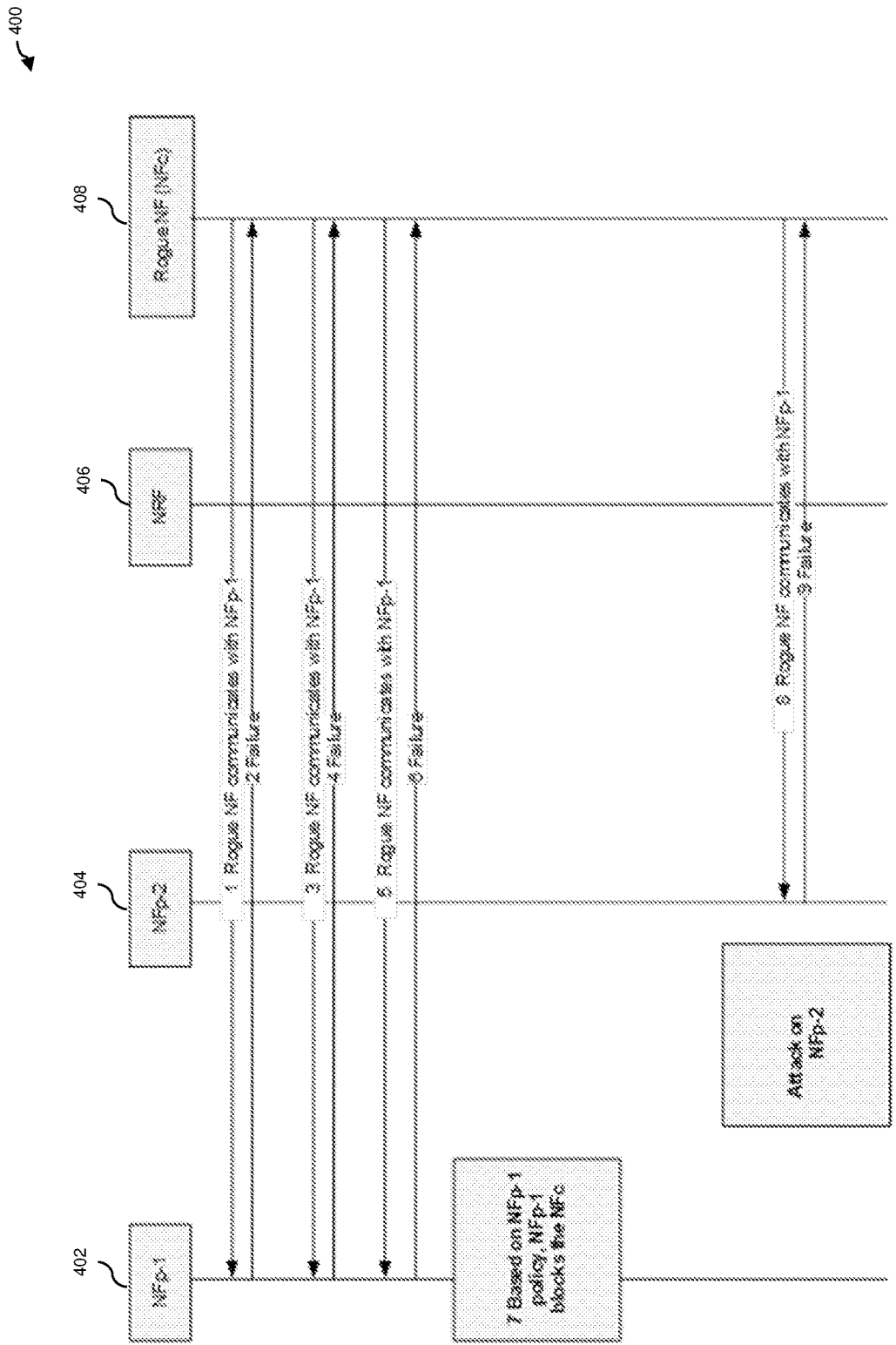
FIG. 4 illustrates a scenario example wherein a rogue network function becomes a security issue in a communication network within which one or more illustrative embodiment can be implemented.

FIG. 4 illustrates a scenario example 400 with a first producer NF 402 (NFp-1), a second producer NF 404 (NFp-2), an NRF (see above, Network Repository Function) 406, and a Rogue consumer NF 408 (NFc).

Assume NFc 408 is not behaving properly or NFc 408 is a rogue NF that keeps on pumping messages towards NFp-1 402, e.g., in FIG. 4, steps 1, 3 and 5 that result in failure messages, e.g., steps 2, 4 and 6, respectively. NFp-1 402 detects the attack based on a local policy and blacklists the NFc 408 so that further communication from NFc 408 is blocked at NFp-1 402 (step 7 in FIG. 4).

As NFc 408 is blacklisted, then the problem is solved at NFp-1 402. However, other NFs in an operator network or PLMN, e.g., NFp-2 404, are still at risk as the rogue NFc 408 can still attack another NF and cause significant damage to the entire network. For example, in the FIG. 4 scenario 400, a message is sent in step 8 to NFp-2 404 by rogue NFc 408 and a failure message is returned in step 9. It could also be possible that as it is an NFp-1 402 level decision that NFc 408 is a suspicious rogue NF, therefore, based on the policy in the NFp-1 402, the NFp-1 402 may unblock the NFc 408 after some time.

However, there is no mechanism available in the current 3GPP specifications for the detection of rogue NF behavior and where multiple NFs collectively decide that the suspicious rogue NF is a confirmed rogue NF and then inform operations, administration and management (OAM) and/or a network operator to take further action, e.g., block a rogue NF at a network level so that further attacks on other NFs can be prevented.

Illustrative embodiments address the above and other challenges by providing techniques for detecting a rogue NF and isolating the rogue NF (and/or performing one or more other remedial actions) in accordance with the 5G core network.

In one or more illustrative embodiments, a solution is to facilitate an NF to update the NRF about a suspicious NF list (i.e., identifying one or more NFs suspected of malicious activity operating within the communication network) so that the NRF, based on an operator policy, can further take action to block the discovery/token request from the rogue NF, so that further attacks by the rogue NF can be prevented which can be targeted for other NFs.

In one or more illustrative embodiments, a solution can also be based on a Network Data Analytics Function (NWDAF) where an NF updates the NWDAF about the suspicious NF list so that the NWDAF, based on an operator policy, can further take action to block the rogue NF or even send an alert for deleting the rogue NF. To facilitate the same, the NWDAF can inform OAM and the OAM can update the rogue NF list in each NF prone for the attack. These solutions are further described below in the context of FIG. 5.

Figure 5:
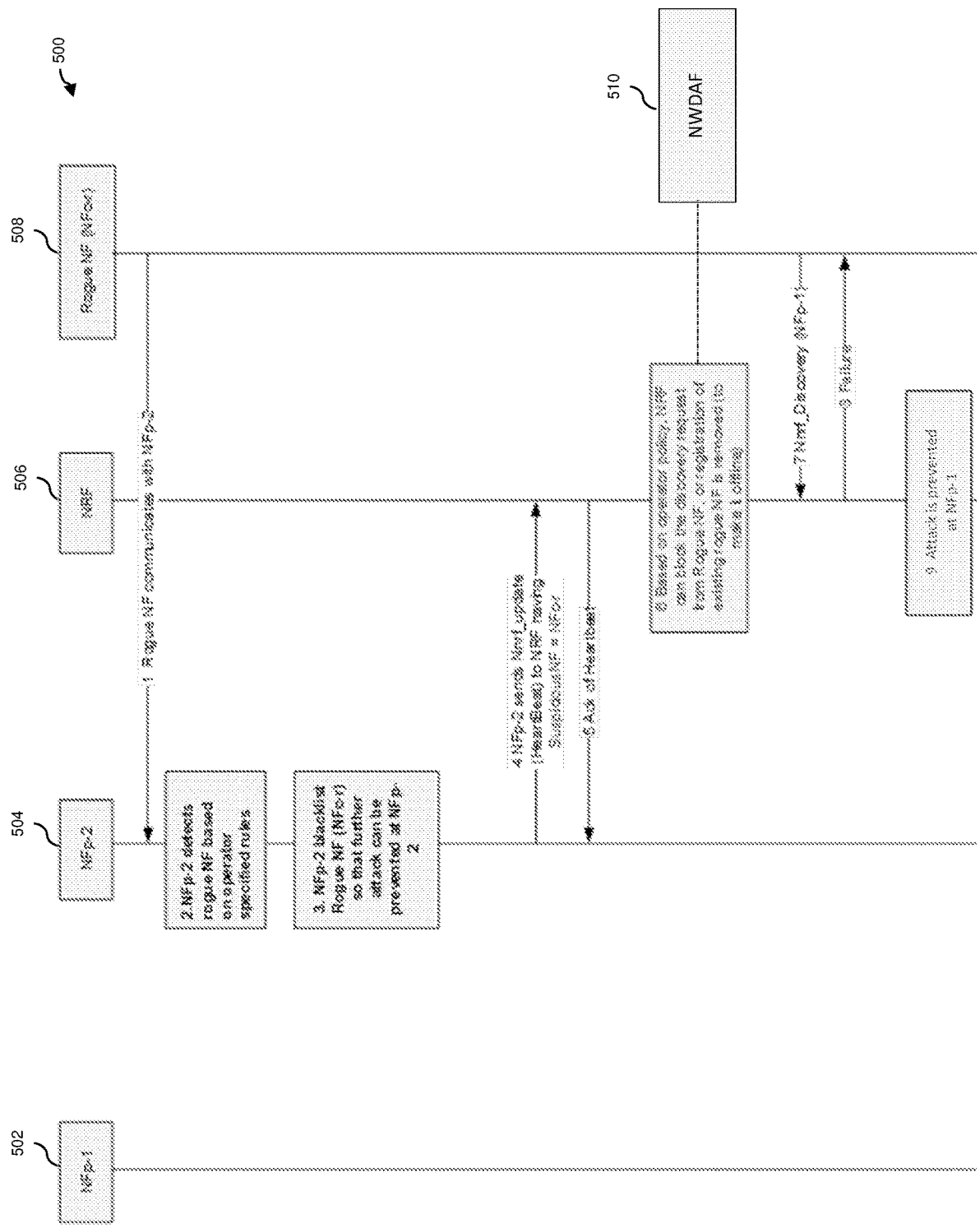
FIG. 5 illustrates a methodology for detecting and isolating a rogue network function, according to an illustrative embodiment.

FIG. 5 illustrates a methodology 500 for detecting and isolating a rogue network function, according to an illustrative embodiment, with a first producer NF 502 (NFp-1), a second producer NF 504 (NFp-2), an NRF 506, and a rogue consumer NF 508 (NFc-r).

As shown, NFc-r 508 communicates with NFp-2 504 in step 1. Based on that communication, in step 2, NFp-2 504 identifies that NFc-r 508 is a rogue NF (e.g., because of a detected DoS attack). In step 3, NFp-2 504 blacklists NFc-r 508.

NFp-2 504 sends a heartbeat (Nnrf_Update) message to the NRF 506 in step 4, e.g., every 5-10 seconds based on the NRF 506 configuration. In the heartbeat message, as shown, NFp-2 504 sends a SuspiciousNFList having NFc-r 508 details to NRF 506. Apart from the heartbeat message, the message NFp-2 504 sends to NRF 506 can be a normal Nnrf_Update message or a new message can also be introduced for the same. NRF 506 acknowledges the message by sending an acknowledgment message to NFp-2 504 in step 5.

Based on different criteria at NRF 506, e.g., multiple NFs reporting suspicious lists having NFc-r 508 details, the NRF 506 in step 6 blocks the discovery request and access token request from the NFc-r 508 and removes the existing subscription request from NFc-r 508 (any new subscription request from NFc-r 508 can also be blocked). Therefore, NFc-r 508 cannot further retrieve the active NFs list from NRF 506 (e.g., request in step 7 and failure message in 8) and further attacks on other NFs (e.g., NFp-1 502) are prevented in step 9. Further isolation actions may include but are not limited to:

(i) If rogue NFc-r 508 is registered in the NRF 506, that registration can also be removed from NRF 506.
(ii) NRF 506 can also update OAM, so that the operator can take further actions to block the rogue NFs at different NFs/gateways.
(iii) NRF 506 triggers to OAM may be used to block the rogue NFs or even delete the VMs hosting the rogue NFs to protect the network.

In an alternative illustrative embodiment, an NWDAF-based solution with an NWDAF 510 is provided within the context of FIG. 5. Assume steps 1, 2 and 3 in FIG. 5 are the same as described above. In one illustrative embodiment, the update can be sent to the NWDAF 510 instead of the NRF 506 directly, i.e., NWDAF 510 has subscribed at NFp-2 504 for any suspicious attacks, then NFp-2 504 can send a notification to the NWDAF 510 having the NFc-r 508 details. Alternatively, the NWDAF 510 subscribes for DoS attacks to the NRF 506 and when NRF 506 receives information from NFs (as described above), then the NRF 506 provides the notification to the NWDAF 510 having the NFc-r 508 information. The NWDAF 510, based on its feedback from different NFs (multiple NFs reporting suspicious NF=NFc-r 508), can decide to block the NFc-r 508. The NWDAF 510 can update to the OAM and the OAM can update the information regarding rogue NFs to all the NFs prone to the attack or the OAM can even delete the VM hosting the NF to protect the entire network.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. The determination and classification of the rogue behavior could be either manual or automatic based on the observed pattern of NF behavior. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

We claim:

1. An apparatus comprising:
   at least one processor; and
   at least one memory storing instructions that, when executed by the at least one processor, cause the apparatus at least to:
   receive from at least one network entity in a communication network a message identifying one or more network entities suspected of malicious activity operating within the communication network; and
   initiate one or more remedial actions within the communication network to prevent the one or more network entities suspected of malicious activity operating within the communication network from accessing other network entities in the communication network;
   wherein initiating one or more remedial actions within the communication network to prevent the one or more network entities suspected of malicious activity operating within the communication network from accessing other network entities in the communication network further comprises blocking a discovery request from each one of the one or more network entities suspected of malicious activity operating within the communication network.

2. The apparatus of claim 1, wherein the apparatus is part of a network repository function.

3. The apparatus of claim 1, wherein the apparatus is part of a network data analytics function.

4. An apparatus comprising:
   at least one processor; and
   at least one memory storing instructions that, when executed by the at least one processor, cause the apparatus at least to:
   receive from at least one network entity in a communication network a message identifying one or more network entities suspected of malicious activity operating within the communication network; and
   initiate one or more remedial actions within the communication network to prevent the one or more network entities suspected of malicious activity operating within the communication network from accessing other network entities in the communication network;
   wherein initiating one or more remedial actions within the communication network to prevent the one or more network entities suspected of malicious activity operating within the communication network from accessing other network entities in the communication network further comprises blocking an access token request from each one of the one or more network entities suspected of malicious activity operating within the communication network.

5. An apparatus comprising:
   at least one processor; and
   at least one memory storing instructions that, when executed by the at least one processor, cause the apparatus at least to:
   receive from at least one network entity in a communication network a message identifying one or more network entities suspected of malicious activity operating within the communication network; and
   initiate one or more remedial actions within the communication network to prevent the one or more network entities suspected of malicious activity operating within the communication network from accessing other network entities in the communication network;
   wherein initiating one or more remedial actions within the communication network to prevent the one or more network entities suspected of malicious activity operating within the communication network from accessing other network entities in the communication network further comprises one of blocking a subscription request and removing an existing subscription request for each one of the one or more network entities suspected of malicious activity operating within the communication network.

* * * * *